(12) United States Patent
Windhager et al.

(10) Patent No.: US 12,367,723 B2
(45) Date of Patent: Jul. 22, 2025

(54) DEVICE FOR CHECKING ACCESS PERMISSIONS

(71) Applicant: Axess AG, Anif/Salzburg (AT)

(72) Inventors: Christian Windhager, Elsbethen (AT); Oliver Suter, Bad Duerrnberg (DE); Daniel Wakounig, Maria Rain (AT); Josef Fischer, Hallein (AT); Stoyan Iliev, Rosenheim (DE); Volker Schoenig, Rohrdorf (DE); Thomas Brunner, Riedering (DE)

(73) Assignee: AXESS AG, Anif/Salzburg (AT)

( * ) Notice: Subject to any disclaimer, the term of this patent is extended or adjusted under 35 U.S.C. 154(b) by 0 days.

(21) Appl. No.: 18/199,674

(22) Filed: May 19, 2023

(65) Prior Publication Data

US 2023/0368597 A1     Nov. 16, 2023

Related U.S. Application Data

(63) Continuation of application No. PCT/AT2021/060437, filed on Nov. 19, 2021.

(30) Foreign Application Priority Data

Nov. 20, 2020  (AT) .............................. A 51013/2020

(51) Int. Cl.
*G07C 9/27* (2020.01)
*H04W 4/80* (2018.01)

(52) U.S. Cl.
CPC ................ *G07C 9/27* (2020.01); *H04W 4/80* (2018.02)

(58) Field of Classification Search
CPC ........ G07C 9/27; G07C 2209/63; G07C 9/20; H04W 4/80; H04W 4/02; G06Q 50/30
See application file for complete search history.

(56) References Cited

U.S. PATENT DOCUMENTS 8,079,515 B2   12/2011   Kocznar et al.
10,163,178 B1  12/2018   Sprogis et al.
(Continued)

FOREIGN PATENT DOCUMENTS

EP   1 990 777      11/2008
JP   2015-162069     9/2015
WO   2018/112224    6/2018

OTHER PUBLICATIONS

International Search Report issued Mar. 25, 2022 in International (PCT) Application No. PCT/AT2021/060437.
(Continued)

*Primary Examiner* — Vernal U Brown
(74) *Attorney, Agent, or Firm* — Wenderoth, Lind & Ponack, L.L.P.

(57) ABSTRACT

A device for checking access permissions includes an access area with guidance devices for forming an access lane for separating people or objects, in which blocking and/or signal means define an access threshold. A gate controller having a Bluetooth radio interface allows an access permission to be read from mobile data carriers, and positive validation of the access permission results in the access controller releasing the blocking and/or signal means and thus allowing separate passage through the access threshold. An access lane has an associated multiphase antenna group, the transmission/reception antennas of which are actuated by a Bluetooth transceiver module via an antenna feed network in such a way that at least two antenna lobes form that are at different distances from the access threshold as seen in the direction of access.

6 Claims, 2 Drawing Sheets

(56) References Cited

U.S. PATENT DOCUMENTS

| | | |
|---|---|---|
| 10,356,550 B2 | 7/2019 | Smith et al. |
| 11,153,708 B2 | 10/2021 | Smith et al. |
| 11,265,674 B2 | 3/2022 | Smith et al. |
| 2009/0032585 A1 | 2/2009 | Kocznar et al. |
| 2018/0068315 A1 | 3/2018 | Bergdale et al. |
| 2018/0144563 A1 | 5/2018 | Reymann |
| 2018/0213355 A1 | 7/2018 | Smith et al. |
| 2018/0374180 A1 | 12/2018 | Sprogis et al. |
| 2019/0297454 A1 | 9/2019 | Smith et al. |
| 2020/0045537 A1 | 2/2020 | Colombo |
| 2020/0128354 A1 | 4/2020 | Smith et al. |
| 2022/0182781 A1 | 6/2022 | Smith et al. |
| 2023/0170628 A1* | 6/2023 | Choi ..................... H01Q 9/045 343/893 |

OTHER PUBLICATIONS

Wikipedia Entry for "Bluetooth Low Energy", https://en.wikipedia.org/wiki/Bluetooth_Low_Energy.

* cited by examiner

DEVICE FOR CHECKING ACCESS PERMISSIONS

BACKGROUND OF INVENTION

Ticket systems are known in different applications, wherein a distinction is made between applications with access control (gated area) and systems without access control (Be-In/Be-Out). The two methods can also be combined.

A permission, which allows access to a particular service and/or location, is referred to as a ticket, wherein the access can be determined in terms of time, location or value and can be personal (non-transferable) or transferable. The ticket can be stored conventionally on media and/or it is stored in a database as a permission.

The present invention is concerned with applications in which at least partial access control is required, such as for example in the case of ski lifts, but it is not limited to this application. For ski lifts, the accesses are usually organized into one or more access lanes by mechanical guiding devices, and ticket readers are arranged in every access lane. The readers detect the ticket of the person entering, check the access permission and, after positive validation, send a release signal to a barrier located in the access lane. The barrier can be a turnstile, a swing door, an optical signal, etc.

In the first generations of such skipass systems, barcode tickets or magnetic stripe cards were used as a ticket medium. The readers were accordingly insert readers for barcodes or magnetic stripe cards.

In order to eliminate the requirement to maintain mechanical readers, these readers were subsequently replaced by contactless RFID transponders, wherein LF (125 kHz), HF (13.56 MHz) and, in the most recent systems, also UHF (900 MHz) are known as RFID technology.

A general disadvantage of ticket systems with ticket media is precisely the need to have ticket media and suitable ticket printers available in order to organize ticket sales. Since nowadays the vast majority of guests and those with access permission already have smartphones, the utilization of a smartphone as ticket medium would be advantageous. This is already used for boarding at the airport, in which the boarding ticket is stored in the smartphone in the form of a barcode.

In applications in which an access has to be passed through a number of times, such as for example at a ski lift, this method would not be suitable, however. For access, the smartphone has to be taken out of the pocket, the ticket retrieved and presented to an optical reader. It is obvious that the handling described would be too complicated with ski clothing and frequent use of the access.

It has also already been proposed to use the radio technologies available in smartphones, such as NFC (Near Field Communication) or Bluetooth, for the ticketing. NFC has too short a range, at a few centimeters, and is therefore awkward.

Bluetooth is a standardized data transmission technology in the 2.4 GHz ISM band and was developed in order to connect devices in a surrounding area of up to 10 meters. Bluetooth is used in particular to transmit audio data. In the first Bluetooth versions, the power consumption was very high, but that was improved with the introduction of a further development from Version 4 onwards (Bluetooth Low Energy). As of recently, even newer Bluetooth versions (5.x) are available, which also provide locating functions. The locating functionality for one thing is not fully developed, and for another is only contained in very few smartphone models. Using Bluetooth as a communication channel between a mobile data carrier (ticket) and the reader in an access lane has to date not yet become accepted. One reason for this is that—due to the long range—it is not ensured that the data of the correct person (smartphone) are being read and processed.

U.S. Pat. No. 10,163,178 describes a system for using mobile data carriers (smartphones), which contains readers for individual access lanes, wherein every reader contains a Bluetooth antenna array. A common Bluetooth location transmitter with a long range is arranged upstream of the readers for the individual access lanes. If a mobile data carrier approaches the location of the access control, then it receives the signals from the location transmitter and is supposed to transmit its ticket data after the connection has been made (check-in process). If the mobile data carrier then reaches an access gate, the Bluetooth antenna array arranged there is supposed to ascertain the position of the data carrier. For this, the Bluetooth antenna array uses directed antenna beams and measures the received signal strength indicator (RSSI). If the validity check by the location transmitter and the position check by the antenna array in the access gate were positive, the access is released. The system described here for using Bluetooth in access control in practice exhibits an inadequate processing efficiency, the required passage times are too long and people for whom access is not immediately provided on reaching the access gate greatly disrupt the flow.

SUMMARY OF THE INVENTION

The object of the invention is therefore to allow a smartphone or comparable mobile medium to be utilized for access control in gated areas with easy handling.

To this end, the invention starts from a device for checking access permissions in an access area with guiding devices for forming an access lane for separating people or objects, in which blocking and/or signal means define an access threshold, with a gate controller with Bluetooth interface for reading an access permission from mobile data carriers. In the case of positive validation of the access permission, the access controller releases the blocking and/or signal means and thus allows separate passage through the access threshold, and an access lane is assigned a multiphase antenna array. The transmitting/receiving antennas of which are actuated by a Bluetooth transceiver via an antenna network for feeding antenna elements in such a way that at least two antenna beams form, which are at different distances from the access threshold, viewed in the access direction.

According to the invention, when not in use, the Bluetooth transceiver continuously transmits short signals (advertising events) via the antenna beam that is at a greater distance from the access threshold, viewed in the access direction, and in such a way activates the Bluetooth interface of an approaching mobile data carrier. Every data carrier with access permission is assigned a unique identifier or permission identifier (UID or permission ID) which can be read via a ticket app which can be activated by Bluetooth interface. The gate controller ascertains the unique identifier or permission identifier from the ticket app via the antenna beam that is at a shorter distance from the access threshold and measures the received signal strength indicator (RSSI) of the signal transmitted by the data carrier. In the case of positive assessment of the received signal strength indicator (RSSI) and positive validation of the unique identifier (UID)

or permission identifier, the access controller generates the release signal for the blocking and/or signal means.

The invention starts from the knowledge that to create an optimally functioning system not only is accurate determination of the position of the read data carrier necessary, but above all the time sequences in the system also have to be adapted to the expected behavior of the person entering. If the entry gate is not immediately released when it is reached, this leads to extreme flow disruptions culminating in complete confusion.

External intervention in the Bluetooth communication processes is possible only to a very limited extent and periods of time for initiating communication steps are largely specified by the operating system. The device according to the invention and the sequences thereof ensure a practical function that corresponds to the desired behavior of the person entering. In other words, the gate opens when the person to be checked arrives in front of the access threshold.

Alternatively, the Bluetooth transceiver determines a release condition from position information from the evaluation of triangulation values of the antenna array.

A preferred embodiment is characterized in that the Bluetooth antenna array comprises at least two and preferably four antenna modules which are arranged at a distance of $\lambda/2$ of the wavelength relative to one another, viewed in the access direction. Directed antenna beams can be produced by means of switches and phase shifters between the input of the antenna network and the antenna modules.

The Bluetooth transceiver actuates the switches and phase shifters in the multiplex, and interrogation signals with unique identifiers or permission identifiers are impressed on the antenna beams.

The guiding devices advantageously delimit an access lane with a width of less than one meter, preferably 60 cm, and, on at least one side of the access lane, a Bluetooth antenna array is arranged immediately in front of, preferably within one meter in front of the access threshold. The antenna array consists of at least two, preferably four, antenna elements, which are at a center-to-center distance of $\lambda/2$ of the wavelength of the Bluetooth frequency from one another, viewed in the access direction, and an antenna network for feeding the antenna elements produces two directed antenna beams within one meter in front of the access threshold, the first of which lies closer to the access threshold and the second of which is at a greater distance from the access threshold, viewed in the access direction.

BRIEF DESCRIPTION OF THE DRAWINGS

The invention is described in more detail below with the aid of an embodiment and with reference to the drawings, in which.

DETAILED DESCRIPTION OF THE INVENTION

General properties of Bluetooth technology are described, for example, at "https://en.wikipedia.org/wiki/Bluetooth-_Low_Energy". Bluetooth is a standardized radio transmission method in the 2.4 GHz ISM band, with which devices can be connected in a surrounding area of 10 meters. In the following description it is assumed that the communication processes of the standardized Bluetooth method are known, without being limited to the methods known under this term. The invention can also be applied to comparable radio communication methods.

Every mobile data carrier 1 is assigned a ticket app (a program module) that can be activated using Bluetooth and a unique identifier or a permission identifier that can be read via the latter. The unique identifier or the permission identifier can be a unique number in the system, which references the actual permission data such as valid location, valid period, valid value of the permission, or also valid personal data. The unique identifier or the permission identifier can also directly contain individual items or all of these permission data.

Figure 1:
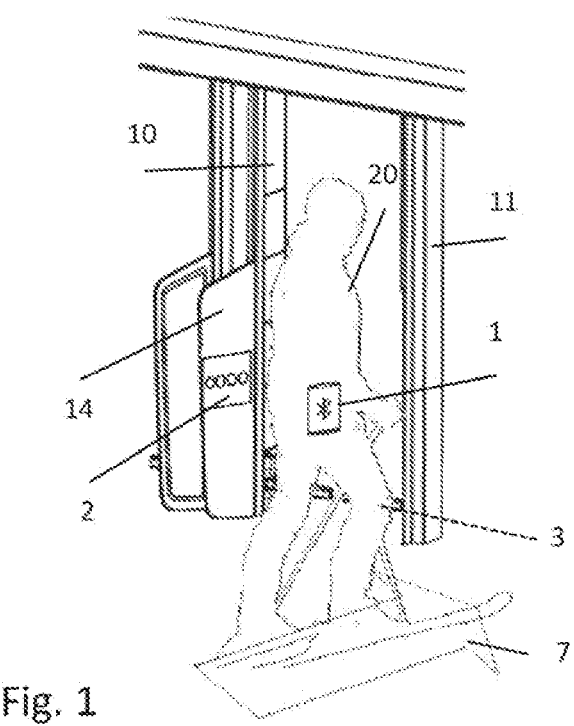
FIG. 1 is an oblique view of an access lane for checking access permissions at a ski lift.

An access lane is represented in an oblique view in FIG. 1, wherein the arrow 7 symbolizes the access direction here. The access lane 7 is delimited on both sides by device columns 10 and 11 at a width of approx. 60 cm, with the result that only one person in each case can enter. Barrier arms 12, 13 that can be pivoted by a motor form an access threshold 3 in the closed state (see also FIG. 2). The space in front of the access threshold 3 is the waiting and checking area, the space behind the threshold is only intended to be reachable with a valid access permission. Further details of such a structure are described, for example, in EP 1990777. In the state shown here, a skier 20 is located immediately in front of the access threshold 3, his access permission is stored in a smartphone 1 with Bluetooth interface. The arrangement is intended to ensure separate access, i.e. the data of a second person in the waiting queue should not be checked instead of the data of the skier 20 immediately in front of the access threshold 3.

As is also explained below, the smartphone 1 connects via its Bluetooth interface and the transmitting/receiving antenna 2 in the access lane 7. The access permission is checked and, in the case of positive validation, the barrier arms 12, 13 swing open in the access direction and clear the access lane 7. The skier 20 passes through the access threshold 3 and the barrier arms 12, 13 immediately close thereafter. The closing is triggered by light barriers, not represented here, in the access lane 7.

Figure 2:
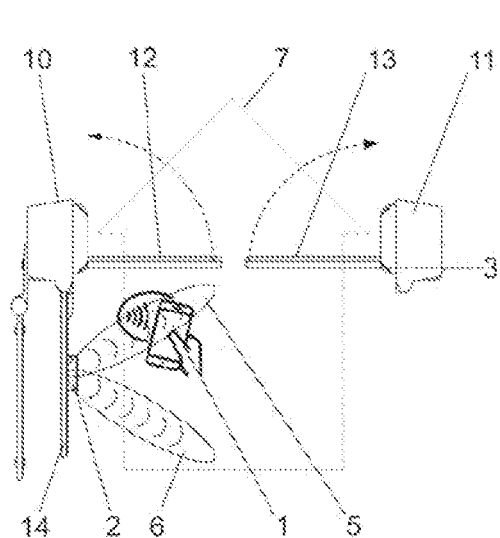
FIG. 2 is a schematic top view of the design of an access lane.

The top view of the access lane 7 for people is represented in FIG. 2. The access lane is 60 cm wide and is formed on both sides by mechanical guiding devices, in the case represented by a left-hand device column 10 and a right-hand device column 11. The device columns 10 and 11 in each case carry a drive, not represented in greater detail here, for barrier arms 12 and 13 which form the access threshold 3 in the closed state represented. Viewed in the access direction 7, the area in front of the access threshold 3 is the waiting area for checking and validation of the access permission. If an access permission is positively validated, the barrier arms 12, 13 then swing open in the access direction; in the drawing, this movement is symbolized by dashed arrows.

The left-hand device column 10 has an antenna mounting plate 14 with a Bluetooth multiphase antenna array 2 which is arranged at a distance of up to one meter in front of the access threshold 3. This Bluetooth multiphase antenna array 2 produces two directed antenna beams, of which the first antenna beam 5 points immediately in front of the access threshold 3. The second antenna beam 6 is at a greater distance from the access threshold 3 than is the first antenna beam 5, viewed in the access direction. In other words, a distance from the second antenna beam 6 to the access threshold 3 is greater than a distance from the first antenna beam 5 to the access threshold 3, as shown in FIG. 2.

Figure 3:
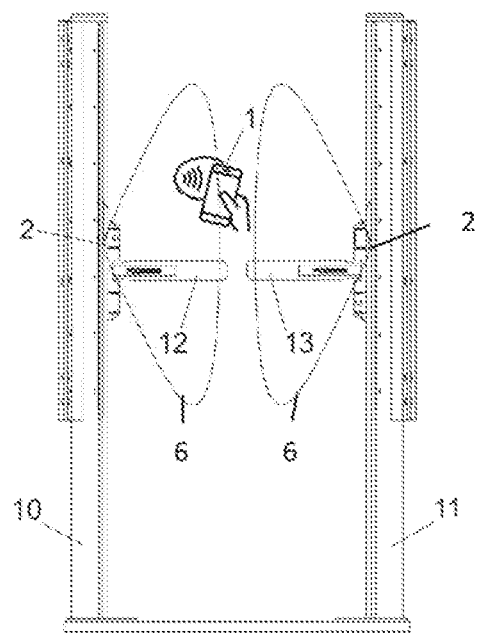
FIG. 3 shows a front view in the access direction.

FIG. 3 shows this device in a front view in the access direction. The device columns 10, 11 are not mounted so as to be suspended here, but rather are fixed to the ground. Furthermore, a variant is represented in FIG. 3 in which the right-hand device column 11 also has a Bluetooth multiphase antenna array 2. This mirrored design can be advantageous in order to be able to more easily detect a smartphone 1 carried on the right-hand side of the body of the user 20.

The user 20—a skier in the example according to FIG. 1—has a smartphone 1 and can comfortably carry it on the body in a pocket. A ticket app (program application), which can be uniquely identified via a UUID (Universal Unique Identifier), is installed on the smartphone 1. The access permission (ticket) is assigned to this UUID. The parameters (i.e. restrictions in terms of time, location, person, value) of the access permission can be stored directly in the app, or these parameters are assigned to the UUID in a database and can be retrieved from there for the validation.

Figure 4:
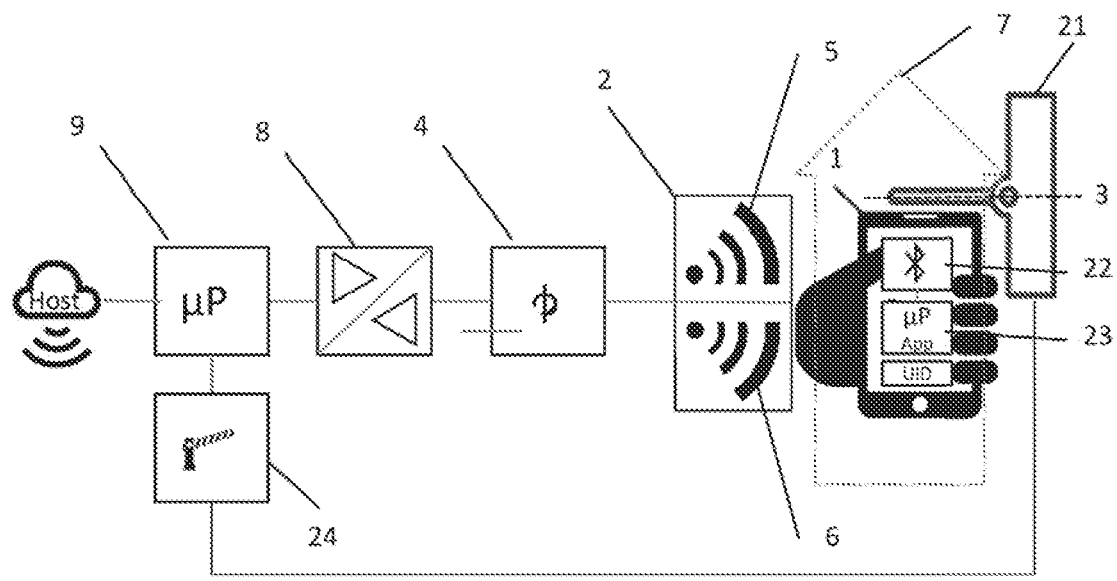
FIG. 4 shows a block diagram with important circuit elements.

FIG. 4 shows a block diagram of circuit elements that are important for the invention. The access control function is monitored and controlled by an access controller 9. The access controller 9 is connected to a Bluetooth transceiver 8, which contains the transmitting and receiving amplifier for the Bluetooth communication. The evaluation of the field strength of the radio signal, i.e. of the RSSI (Received Signal Strength Indicator), is important for the function. This signal is an indicator of the distance of the smartphone 1 relative to the entry threshold 3.

The Bluetooth transceiver 8 actuates the antenna array 2 via an antenna network 4. Antenna network 4 and antenna array 2 are formed such that at least two directed antenna beams 5 and 6 are generated. The first antenna beam 5 points into an area immediately in front of the access threshold 3, viewed in the access direction. The second antenna beam 6 is oriented such that it is at a greater distance from the front of the access threshold 3 than is the first antenna beam 5, viewed in the access direction.

In the waiting position, the blocking/signal element 21 is closed. The Bluetooth transceiver 8 continuously generates so-called short signals (advertising events) and transmits them via the second antenna beam 6, which is at a greater distance from the access threshold 3 than is the first antenna beam 5. If a person now moves into the waiting position, i.e. in the direction of the access threshold 3, then his smartphone 1 receives these radio signals via the Bluetooth interface 22 and they activate communication readiness.

If the person 20 moves further in the direction of access threshold 3, the smartphone 1 enters the reception range of the antenna beam 5 and the access controller 9 retrieves validity data by the ticket app of the smartphone 1 transmitting the unique ID or permission ID. If the validity data correspond to the predetermined criteria of the respective access, then the access permission is deemed to be validated.

In addition, the access controller 9 assesses the received signal strength indicator (RSSI) transmitted by the smartphone 1 and received via the antenna beam 5 and therefrom forms a criterion for the immediate approach of the person 20, of the data carrier 1 to the access threshold 3.

The smartphone 1 and its user 20 are now located immediately in front of the access threshold 3. If both checks are positive, the access permission is positive and the position determination is positively validated, then the access controller 9 sends a release signal to the gate controller 24 of the signal or blocking element 21 and waits with the next inquiry until the person 20 has passed through the access threshold 3.

The logic operations can in principle be freely assigned to the circuit elements. The validation can for example be effected through inquiry in the database of the system; in this case, the validity data are stored e.g. in the host. The checking can, however, also be effected locally by the app installed on the smartphone transmitting the validity parameters via the Bluetooth interface, or the app checks autonomously and internally by determining whether its access parameters are valid for the location of the access point (access number).

Figure 5:
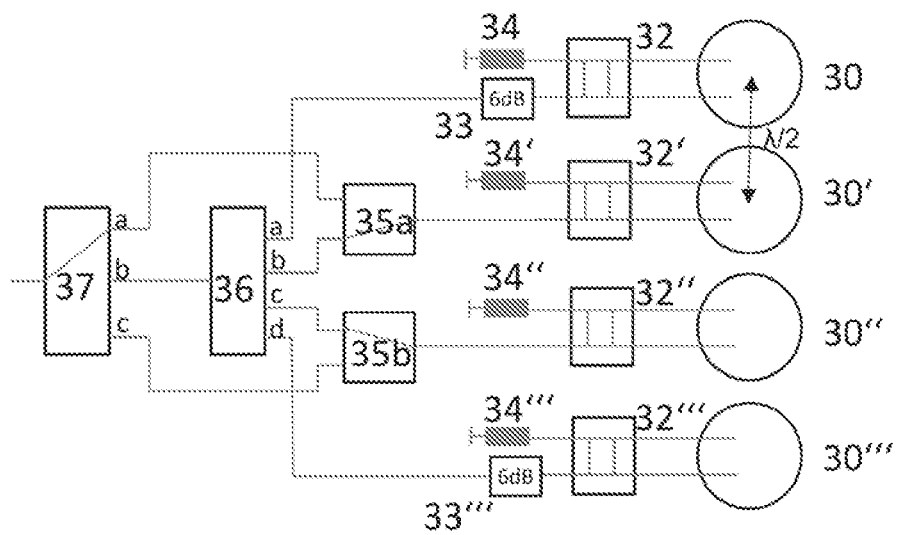
FIG. 5 shows a block diagram of an antenna network.

FIG. 5 shows the antenna network 4 in conjunction with elements of the Bluetooth antenna array 2. The antenna array 2 uses four round patch antennas 30, 30', 30'', 30''', which are in each case at a distance of $\lambda/2$ of the wavelength of the Bluetooth frequency from one another, viewed in the access direction. The patch antennas 30 are actuated via 90° hybrid dividers 32, which are terminated with 50 Ohm resistors 34. In each case 6 dB attenuators 33 and 33''' are arranged upstream of the patch antennas 30 and 30''' lying on the outside in order to make it possible to suppress the side beams. A 3-way switch 37 with the outputs a, b, c forms the input of the antenna network 4. The output 37a is connected to a 2-way switch 35a, the output 37c is connected to a 2-way switch 35b, the output 37b is connected to a power divider 36.

The power divider 36 has 4 outputs a, b, c, d and two states. In the first state the phase is shifted in each case by +90° at outputs a to d, in the second state it is shifted in each case by −90°. The output 36a actuates the patch antenna 30, the output 36d actuates the patch antenna 30'''. The outputs 36b and 36c can be connected to the patch antennas 30' and 30'' lying on the inside via switches 35a and 35b.

The antenna network represented here can emit a circularly polarized electromagnetic wave in order to produce a more position-independent pairing with the smartphone.

The two directed antenna beams 5 and 6 are produced by switching the power divider 36 from the first state into its second state. The inner patch antennas 30' and 30'' can additionally be directly connected to the switch 37 via the switches 35a and b. The antenna network thus makes it possible also to use the phase difference of the signals at these antennas in addition to the position determination using the directed antenna beams 5, 6.

The invention claimed is:

1. A device for checking access permissions comprises:
an access area including:
   guiding devices defining an access lane for separating people or objects,
   a blocking and/or signal element defining an access threshold, and
   an access controller including a Bluetooth interface configured to read an access permission from mobile data carriers,
   wherein the access controller and the blocking and/or signal element are configured such that, when a positive validation of the access permission is received, the access controller releases the blocking and/or signal element and thus allows separate passage through the access threshold, and
a multiphase antenna array, including transmitting/receiving antennas configured to be actuated by a Bluetooth transceiver via an antenna network to generate at least two antenna beams at different distances from the access threshold with respect to an access direction, the at least two antenna beams including a first antenna beam and a second antenna beam located a greater distance from the access threshold than is the first antenna beam, wherein the Bluetooth transceiver is configured to continuously transmit short signals via the second antenna beam located at the greater distance from the access threshold than is the first antenna beam so as to activate a Bluetooth interface of an approaching mobile data carrier, every approaching mobile data carrier with access permission being assigned a unique identifier or permission identifier to be read via a ticket app to be activated by the Bluetooth interface, wherein the access controller is configured to retrieve the unique identifier or permission identifier from the ticket app of the approaching mobile data carrier via the first antenna beam located a shorter distance from the access threshold than is the second antenna beam, and to measure a received signal strength indicator of a signal transmitted by the mobile data carrier at the first antenna beam, and wherein the access controller is further configured to, when a positive assessment of the received signal strength indicator and a positive validation of the unique identifier or permission identifier of the approaching mobile data carrier is received, generate a release signal sent to the blocking and/or signal element to open the blocking and/or signal element.

2. The device according to claim 1, wherein the Bluetooth transceiver is configured to generate a release signal by linking validation information and an item of position information from an evaluation of triangulation values of the antenna array.

3. The device according to claim 1, wherein the multiphase antenna array having transmitting/receiving antennas to be actuated by the Bluetooth transceiver comprises at least two antenna modules arranged at a distance of $\lambda/2$ of the wavelength relative to one another with respect to the access direction, the multiphase antenna array having the transmitting/receiving antennas includes switches and phase shifters between an input of the antenna network and the at least two antenna modules to generate the at least two antenna beams at different distances from the access threshold.

4. The device according to claim 3, wherein the multiphase antenna array having transmitting/receiving antennas to be actuated by the Bluetooth transceiver comprises four antenna modules arranged at a distance of $\lambda/2$ of the wavelength relative to one another.

5. The device according to claim 1, wherein:
the guiding devices delimit an access lane with a width of less than one meter,
a Bluetooth antenna array is arranged on at least one side of the access lane immediately in front of the access threshold,
the Bluetooth antenna array comprises at least two antenna modules arranged at a center-to-center distance of $\lambda/2$ of the wavelength of the Bluetooth frequency from one another with respect to the access direction, and
the antenna network is configured to generate the at least two directed antenna beams within one meter in front of the access threshold, the first antenna lying closer to the access threshold than is the second antenna with respect to the access direction.

6. The device according to claim 5, wherein:
the guiding devices delimit an access lane with a width of 60 cm,
the Bluetooth antenna array is arranged within one meter in front of the access threshold,
the multiphase antenna array comprises four antenna modules arranged at a center-to-center distance of $\lambda/2$ of the wavelength of the Bluetooth frequency from one another with respect to the access direction, and
the antenna network is configured to generate the at least two antenna beams within one meter in front of the access threshold.

\* \* \* \* \*